(12) United States Patent
Chen et al.

(10) Patent No.: US 6,430,806 B1
(45) Date of Patent: Aug. 13, 2002

(54) METHOD FOR MANUFACTURING AN INDUCTIVE WRITE ELEMENT EMPLOYING BI-LAYER PHOTORESIST TO DEFINE A THIN HIGH MOMENT POLE PEDESTAL

(75) Inventors: Yingjian Chen, Fremont; Ron Barr, Mountain View; Hua-Ching Tong, San Jose; Stone Shi, Fremont; Kyusik Sin, Palo Alto, all of CA (US)

(73) Assignee: Read-Rite Corporation, Fremont, CA (US)

( * ) Notice: Subject to any disclaimer, the term of this patent is extended or adjusted under 35 U.S.C. 154(b) by 38 days.

(21) Appl. No.: 09/602,536

(22) Filed: Jun. 23, 2000

(51) Int. Cl.[7] .............................................. G11B 5/147
(52) U.S. Cl. ............................... 29/603.07; 29/603.14; 29/603.15; 360/126
(58) Field of Search ................................. 360/317, 119, 360/126; 216/22; 29/603.07, 603.13, 603.14, 603.15

(56) References Cited

U.S. PATENT DOCUMENTS

| | | |
|---|---|---|
| 5,283,942 A | 2/1994 | Chen et al. .................. 360/125 |
| 5,452,164 A | 9/1995 | Cole et al. ................... 360/119 |
| 5,606,478 A | 2/1997 | Chen et al. .................. 360/126 |
| 5,639,506 A | 6/1997 | Smyth ........................ 427/2.31 |
| 5,649,351 A | 7/1997 | Cole et al. ............... 29/603.14 |
| 5,652,687 A | 7/1997 | Chen et al. .................. 360/126 |
| 5,658,469 A | 8/1997 | Jennison ....................... 216/22 |
| 5,726,841 A | 3/1998 | Tong et al. .................. 360/122 |
| 5,802,700 A | 9/1998 | Chen et al. ............... 29/603.14 |
| 5,804,085 A | 9/1998 | Wu et al. ...................... 216/22 |
| 5,809,637 A | 9/1998 | Rottmayer ............... 29/603.15 |
| 5,867,890 A | 2/1999 | Hsiao et al. ............. 29/603.14 |
| 5,878,481 A | 3/1999 | Feng et al. .............. 29/603.15 |
| 5,893,981 A | 4/1999 | Dovek et al. .................. 216/22 |
| 5,901,432 A | 5/1999 | Armstrong et al. ....... 29/603.14 |
| 5,916,423 A | 6/1999 | Westwood ............. 204/192.32 |
| 5,938,941 A | 8/1999 | Ishiwata et al. ............... 216/22 |
| 5,949,625 A | 9/1999 | Sato et al. ................... 360/122 |
| 5,959,813 A | 9/1999 | Watanabe et al. ........... 360/126 |
| 5,966,800 A | 10/1999 | Huai et al. ................ 29/603.13 |
| 5,978,183 A | 11/1999 | Hsiao et al. .................. 360/323 |
| 5,996,213 A | 12/1999 | Shen et al. ............... 29/603.15 |
| 6,188,544 B1 * | 2/2001 | Mino .......................... 360/126 |
| 6,195,229 B1 * | 2/2001 | Shen et al. ................... 360/119 |
| 6,339,523 B1 * | 1/2002 | Santini ........................ 360/317 |
| 6,339,524 B1 * | 1/2002 | Furusawa et al. ........... 360/317 |
| 6,339,872 B1 * | 1/2002 | Chang et al. ............. 29/603.14 |
| 6,353,995 B1 * | 3/2002 | Sasaki et al. ............. 29/603.14 |

* cited by examiner

Primary Examiner—Jefferson Evans

(57) ABSTRACT

An inductive write element for use with a magnetic data recording and retrieval system is provided. The write element includes a magnetic yoke having an electrically conductive coil passing there through. The yoke is constructed of first and second magnetic poles, and performance of the write element is improved by the inclusion of a very thin pedestal of a high magnetic moment material on the first pole in the pole tip region. Further performance gains are realized by providing a tapered edge on the pedestal to facilitate magnetic flux flow through the pedestal.

9 Claims, 6 Drawing Sheets

METHOD FOR MANUFACTURING AN INDUCTIVE WRITE ELEMENT EMPLOYING BI-LAYER PHOTORESIST TO DEFINE A THIN HIGH MOMENT POLE PEDESTAL

FIELD OF THE INVENTION

This invention relates generally to magnetic disk storage systems, and more particularly to write heads having low height, high moment pedestals.

BACKGROUND OF THE INVENTION

Magnetic disk drives are used to store and retrieve data for digital electronic apparatus such as computers. In FIGS. 1A and 1B, a magnetic disk data storage system 10 of the prior art includes a sealed enclosure 12, a disk drive motor 14, one or more magnetic disks 16, supported for rotation by a drive spindle 13 of motor 14, and an actuator 18 including at least one arm 20, the actuator being attached to an actuator spindle 21. Suspensions 22 are coupled to the ends of the arms 20, and each suspension supports at its distal end a read/write head or transducer 24. The head 24 (which will be described in greater detail wit reference to FIGS. 2A and 2B) typically includes an inductive write element with a sensor read element As the motor 14 rotates the magnetic disk 16, as indicated by the arrow R, an air bearing is formed under the transducer 24 causing it to lift slightly off the surface of the magnetic disk 16, or, as is termed in the art, to "fly" above the magnet disk 16. Alternatively, some transducers, known as contact heads, ride on the disk surface. Various magnetic "tracks" of information can be written to and/or read from the magnetic disk 16 as the actuator 18 causes the transducer 24 to pivot in a short arc. The design and manufacture of magnetic disk data storage systems is well known to those skilled in the art.

FIG. 2A shows the distal end of the head 24 having a write element 26. The write element 26 is shown enlarged and with portions exposed for clarity. The write element 26 includes a magnetic yoke 28 having an electrically conductive coil 30 passing therethrough.

The write element 26 can be better understood with reference to FIG. 2B, which shows the write element 26 and an integral read element 32 in cross section. The head 24 includes a substrate 34 above which the read element 32 and the write element 26 are disposed. An edge of the read element 32 and of the write element 26 also define an air bearing surface ABS, in a plane 36, which can be aligned to face the surface of the magnetic disk 16 (see FIGS. 1A and 1B). The read element 32 includes a first shield 38, a second shield 40, and a read sensor 42 that is located within a dielectric medium 44 between the first shield 38 and the second shield 40. The most common type of read sensor 42 used in the read/write head 24 is the magnetoresistive (AMR or GMR) sensor, which is used to detect magnetic field signal changes in a magnetic medium by means of changes in the resistance of the read sensor imparted from the changing magnitude and direction of the magnetic field being sensed.

The write element 26 is typically an inductive write element that includes the second shield 40 (which functions as a first pole for the write element) and a second pole 46 disposed above the first pole 40. Since the present invention focuses on the write element 26, the second shield/first pole 40 will hereafter be referred to as the "first pole". The first pole 40 and the second pole 46 contact one another at a backgap portion 48, with these three elements collectively forming the yoke 28. The combination of a first pole tip portion and a second pole tip portion near the ABS are sometimes referred to as the yoke tip portion 50. A write gap 52 is formed between the first and second poles 40 and 46 in the yoke tip portion 50. The write gap 52 is filled with a non-magnetic, electrically insulating material that forms a write gap material layer 54. This non-magnetic material can be either integral with (as is shown here) or separate from a first insulation layer 56 that lies upon the first pole 40 and extends from the yoke tip portion 46 to the backgap portion 40. The conductive coil 30, shown in cross section, passes through the yoke 28, sitting upon the write gap material 54. A second insulation layer 58 covers the coil and electrically insulates it from the second pole 46.

An inductive write head such as that shown in FIGS. 2A and 2B operates by passing a writing current through the conductive coil 30. Because of the magnetic properties of the yoke 28, a magnetic flux is induced in the first and second poles 40 and 46 by write currents passed through the coil 30. The write gap 52 allows the magnetic flux to fringe out from the yoke 28 (thus forming a fringing gap field) and to cross a magnetic recording medium that is placed near the ABS.

With reference to FIG. 2C, a critical parameter of a magnetic write element is the trackwidth of the write element, which defines track density. For example, a narrower trackwidth can result in a higher magnetic recording density. The Width is defined by the geometries in the yoke tip portion at the ABS. In some newer designs a pedestal 60 is construed of a high magnetic moment material (high $B_{sat}$), having a width W3. The high $B_{sat}$ pedestal promotes concentration of magnetic flux in the yoke tip region 50 of the write element 26. As can be seen from this view, the first and second poles 40 and 46 can have different widths W2 and W1 respectively in the yoke tip portion 50. The pedestal has a width W3, which in some implementations can have the same width as that of the second pole W1, as when the pedestal is created by a self aligning process.

With reference to FIG. 2B, the fringing gap field of the write element can be further affected by the positioning of the zero throat level ZT. ZT is defined as the distance from the ABS to the first divergence between the first and second pole, and it can be defined by either the first or second pole 40, 46 depending upon which has the shorter pole tip portion. If the first pole 40 includes a pedestal 60, then ZT is usually defined by the pedestal depth. The pedestal provides a well defined ZT. In order to prevent flux leakage from the second pole 46 into the back portions of the first pole 40, it is desirable to provide a zero throat level in a well defined plane which is parallel to the plane of the ABS. Thus, accurate definition of the trackwidth, and zero throat is critical during the fabrication of the write element.

The performance of the write element is further dependent upon the properties of the magnetic materials used in fabricating the poles of the write element. In order to achieve greater overwrite performance, magnetic materials having a high saturation magnetic flux density $B_{sat}$ are preferred. A common material employed in forming the poles is high Fe content (55 at % Fe) NiFe alloy having a $B_{sat}$ of about 16 kG. However, high Fe content NiFe alloy has a high magnetostriction constant $\lambda s$ (on the order of $10^{-5}$) which causes undesirable domain formation in the poles. It is known that the domain wall motion in the writer is directly related to the increase in popcorn noise in the read element, especially when the motion occurs in the first pole, which also serves as a shield for the read element.

A reduction in popcorn noise in the read element can be achieved through the use of soft magnetic materials, (i.e.

materials having a low magnetostriction constant) in the fabrication of the first pole 40. However, such materials generally have limited $B_{sat}$. In order to promote concentration of magnetic flux density in the yoke tip region, a high $B_{sat}$ material is used to form the pedestal 60.

The size and shape of the pedestal has dramatic affect on the flow of magnetic flux in the yoke tip region 50. For example, the abrupt angle between the pedestal 60 and the rest of the first pole 40 inhibits flux flow and can lead to choking or saturation of flux. In addition, a thick pedestal (i.e. in the direction from the first pole 40 to the write gap 52) causes further choking of the flux and also leads to poorly defined signal pulses. Therefore, accurate control of pedestal size and shape is critical. Creating a pedestal which is sufficiently thin and also has a desirable shape has been limited by available manufacturing techniques. For example, existing manufacturing techniques which employ CMP can not be used to construct a pedestal with a tightly controlled thickness, thus limiting the pedestal to an overall minimum size.

Therefore, there remains a need for a process for manufacturing a desired thin pedestal. The process would necessarily allow tighter control of thickness than is possible with previous processes and would also allow the shape of the pedestal to be controlled to soften the angle of the transition between the pedestal and the rest of the first pole 40. In addition, the process would allow the pedestal to be constructed of a high $B_{sat}$ material, many of which materials must be sputter deposited.

SUMMARY OF THE INVENTION

The present invention provides a method for manufacturing a write element for use in a magnetic data recording system, the write element having a thin pedestal having a well controlled shape and size. A first pole is constructed of a soft magnetic material. A layer of high $B_{sat}$ material is then deposited onto the magnetic material of the first pole. A bi-layer photoresist is patterned onto the layer of high $B_{sat}$ material in a pattern corresponding to the desired pedestal shape. The high $B_{sat}$ material layer is then etched, forming a pedestal with a tapered edge, by removing material from the region not covered by the bi-layer photoresist A first insulation layer is then deposited, and the bi-layer photoresist is subsequently lifted off. Thereafter, a layer of write gap material is deposited and an electrically conductive coil is formed on the write gap material. A second insulation layer is applied, and a second pole is formed so as to be electrically connected with the first pole.

The etching can be performed in such a manner that the edge of the pedestal can be a smoothly tapered. This advantageously promotes smooth flux flow through the pole tip region of the first pole. In addition, the process allows the high $B_{sat}$ material to be sputter deposited. This is advantageous in that currently available high $B_{sat}$ materials cannot be plated and must, therefore, be sputter deposited.

Another aspect of the invention is that it allows excellent control of pedestal thickness. One reason that the thickness of the pedestal can be tightly controlled is that chemical mechanical polishing is not required. CMP processes remove material in a manner which is difficult to accurately control, and therefore a relatively large tolerance in pedestal thickness would be required if such a process were used.

The bi-layer photoresist includes a first layer and a second layer that covers and extends beyond the edge of the first layer. The portion of the second layer extending beyond the first layer creates an overhang. When the first insulation layer is subsequently applied, the first insulation layer will form a smooth tapered edge terminating beneath the overhang. The termination point of the insulation layer can be controlled by the amount of overhang on the bi-layer photoresist or can also be controlled by the manner in which the first insulation layer is deposited. Although the deposited first insulation layer will cover the photoresist, the portion under the overhang will be accessible to chemicals for lifting off the photoresist.

For a fuller understanding of the nature and advantages of the present invention, reference should be made to the following detailed description taken together with the accompanying figures.

BRIEF DESCRIPTION OF THE FIGURES

The present invention will be readily understood by the following detailed description in conjunction with the accompanying drawings, with like reference numerals designating like elements.

DETAILED DESCRIPTION OF THE PREFERRED EMBODIMENTS

Figure 1A:
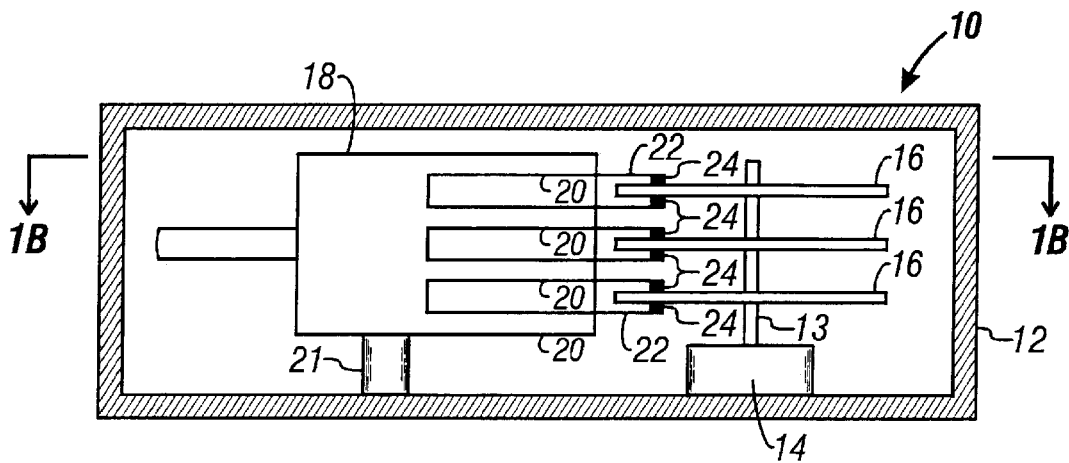
FIG. 1A is a partial cross-sectional front elevation view of a magnetic data storage system of the background art.
Figure 1B:
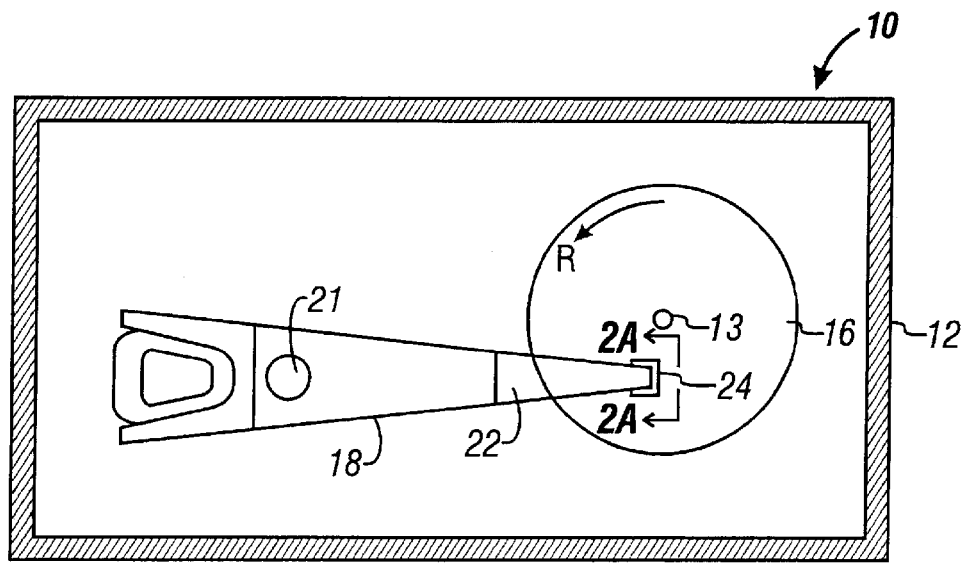
FIG. 1B is a top plan view taken along line 1B—1B of FIG. 1A.
Figure 2A:
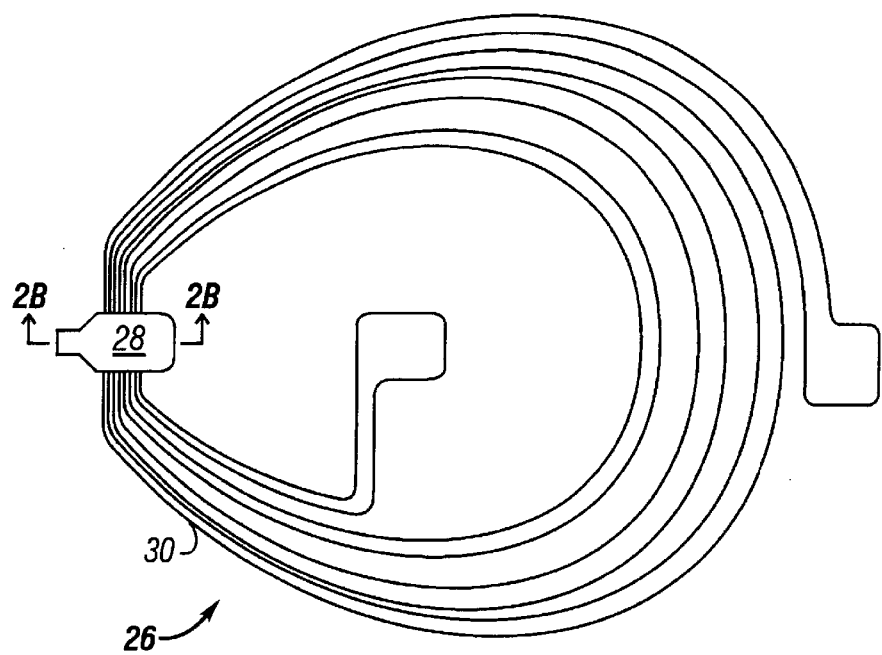
FIG. 2A is a plan view of a read/write head of the background art, taken from 2A—2A of FIG. 1B, shown enlarged.
Figure 2B:
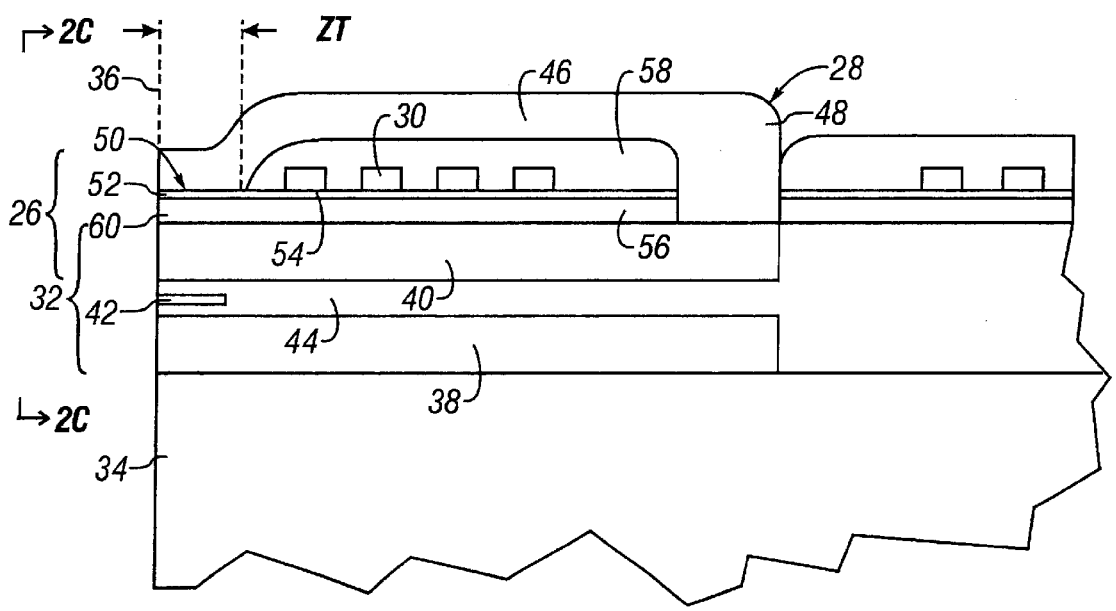
FIG. 2B is a view taken from line 2B—2B of FIG. 2A, shown enlarged.
Figure 2C:
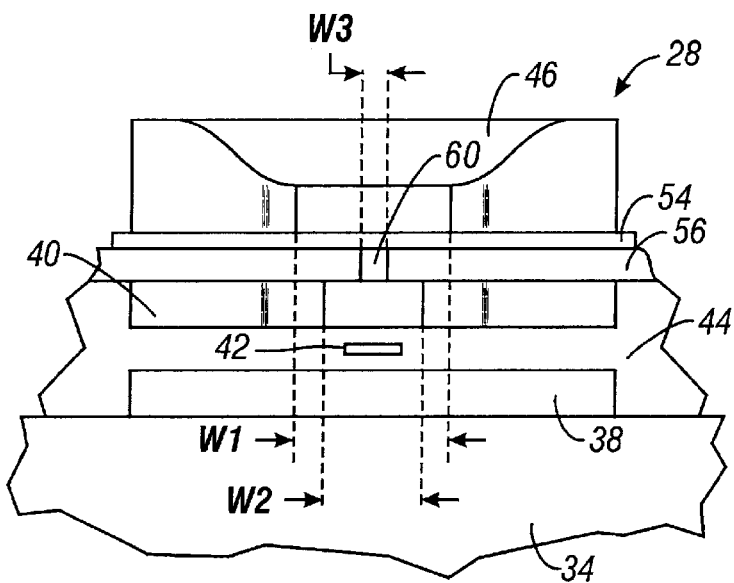
FIG. 2C is a view taken from line 2C—2C of FIG. 2B.
Figure 3:
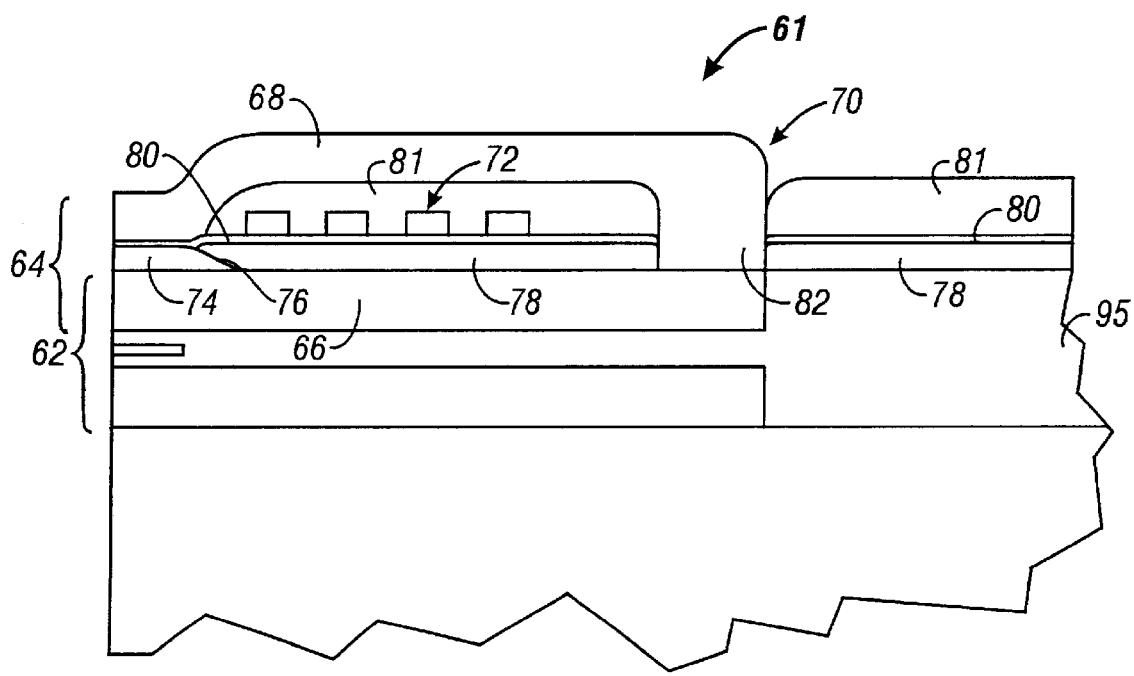
FIG. 3 is a cross sectional view similar to FIG. 2B showing a read/write head of the present invention.

With reference to FIG. 3, the present invention is embodied in a combination read/write head, generally designated 61, having merged read and write elements 62, 64, construction of the read element having been previously discussed in the background of the invention with reference to FIGS. 1A through 2C. The write element 64 includes first and second magnetic poles 66, 68, which join to form a magnetic yoke 70. An electrically conductive coil 72 passes through the interior of the yoke 70, and is electrically isolated therefrom. The first magnetic pole includes at its pole tip portion a pedestal 74 which will be described in greater detail below.

With continued reference to FIG. 3, the first pole 66 is primarily constructed of a soft magnetic material (i.e. low magnetorestriction). A pedestal 74 is formed on the first pole 66 at the pole tip region, constructed of a high $B_{sat}$ material. The pedestal is very thin, preferably between 0.1 and 1.0 μm, and more preferably less than 0.5 μm. The pedestal has a smoothly tapered edge 76. The smoothly tapered edge 76 facilitates the smooth flow of magnetic flux through the pole tip region of the first pole 66.

A first insulation layer 78 covers the first pole 66, and terminates at the pedestal 74. The first insulation layer 78 preferably terminates in a smoothly tapered edge which ends near the apex of the tapered edge as shown in FIG. 3. Depending upon design requirements, the tapered edge of the first insulation layer can be located at various locations relative to the pedestal 74. For example, if desired, the first insulation layer 78 can be formed to terminate at the upper surface of the pedestal beyond the tapered edge 76. Alternatively, if desired, the edge of the first insulation layer can be formed to end along the tapered edge 76 at a lower point away from the apex and toward the termination of the tapered edge 76. The first insulation layer 78 is preferably formed of $Al_2O_3$ which is sputter deposited. However, as will be appreciated by those skilled in the art, other dielectric materials can be used as well.

With continued reference to FIG. 3, a layer of write gap material 80 sits atop the first insulation layer 78 and the pedestal 74. The write gap material is preferably constructed of silicon, but can also be constructed of other dielectric materials such as $Al_2O_3$. The electrically conductive coil 72 includes a plurality of winds, with a portion of each wind passing through the yoke 70. The coil sits atop the write gap material layer 80. The coil is preferably constructed of copper (Cu) and is manufactured according to a photolithographic process, which will be familiar to those skilled in the art.

With further reference to FIG. 3, a second insulation layer 81 covers the coil 72 and electrically insulates it from the yoke 70. The second insulation layer 81 is preferably constructed of cured photoresist which is deposited by a pbotolithographic process and cured at a high temperature. the second pole 68 covers the second insulation layer 81 and electrically couples with the first pole 66 at a backgap region 82 to form the yoke 70.

Figure 4:
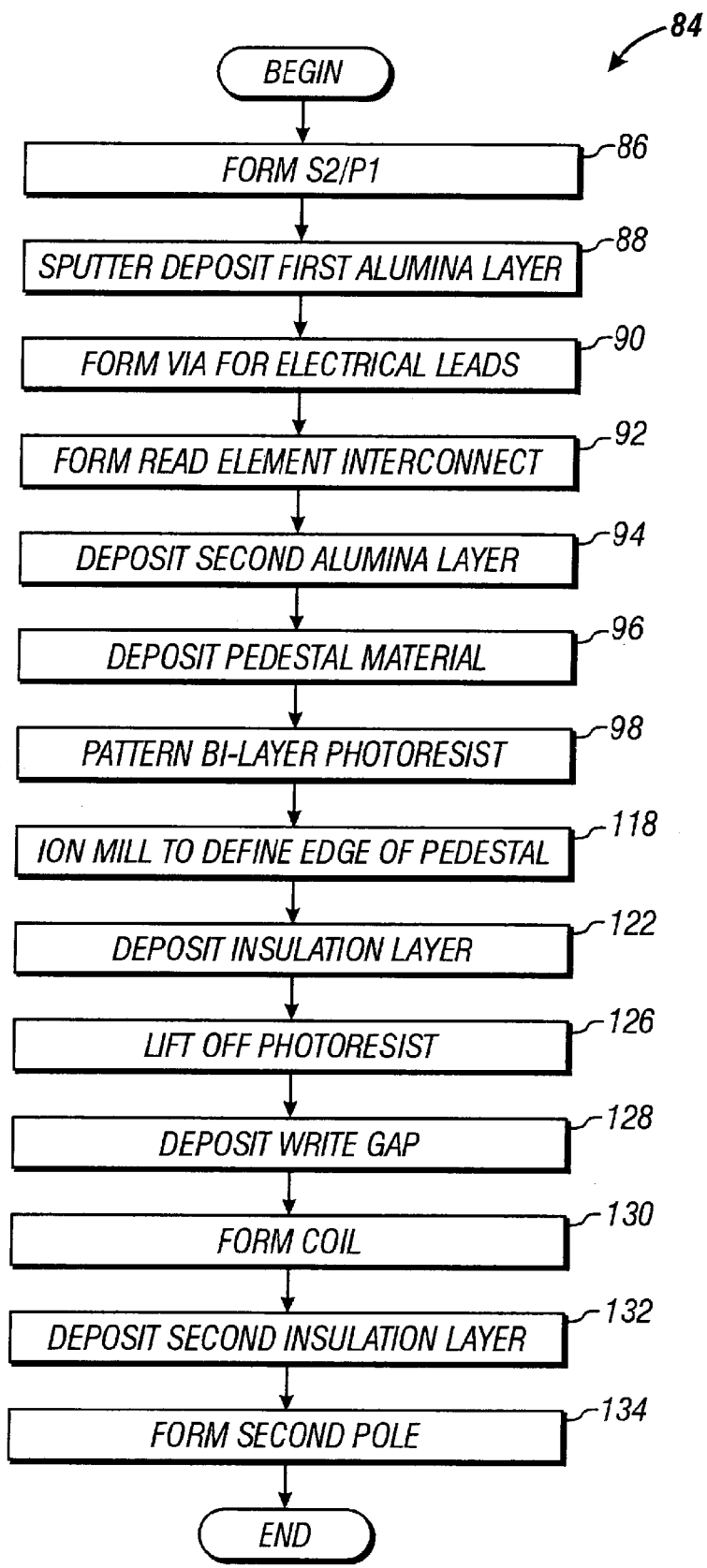
FIG. 4 is a flow diagram of a process for producing a read/write head of the present invention.

With reference to FIG. 4, a process 84 for constructing the write element 64 of the present invention will be described. The read element 62 having been partially constructed according to methods familiar to those skilled in the art, the process 84 begins with a step 86 of providing the first pole 66. The first pole 66 is preferably formed of a nickel iron alloy NiFe by a plating process which will be familiar to those skilled in the art, but can also be deposited by sputtering and can be formed of another soft magnetic material. Then, in a step 88 a protective layer of alumina ($Al_2O_3$) is sputter deposited to provide electrical insulation between S1 and a read element interconnect (not shown). Then, in a step 90 vias (not shown) are provided for a set of read sensor leads (also not shown). The leads vias are formed by a wet etch process which will be familiar to those skilled in the art. Thereafter, in a step 92 a read element interconnect is formed (not shown). The interconnect is electroplated copper formed to about 1.0 to 1.5 $\mu$m, which is thinner than the final target thickness of the first pole 66 (FIG. 3). Thereafter, in a step 94 another layer of $Al_2O_3$ is deposited and planarized using a chemical mechanical polishing process. This results in a layer of insulation 95 having a smooth upper surface (FIG. 3), which is flush with a smooth upper surface of the first pole 66. The chemical mechanical polishing process preferably results in a first pole 66 that is 1.5–3 $\mu$m thick.

Figure 5:
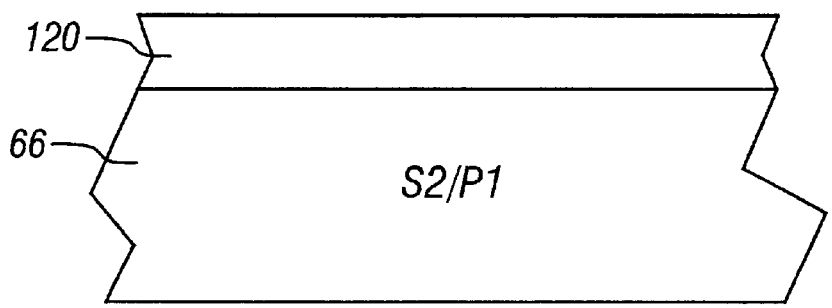
FIGS. 5–9 show the read write head of the present invention in various, intermediate stages of manufacture.
Figure 6:
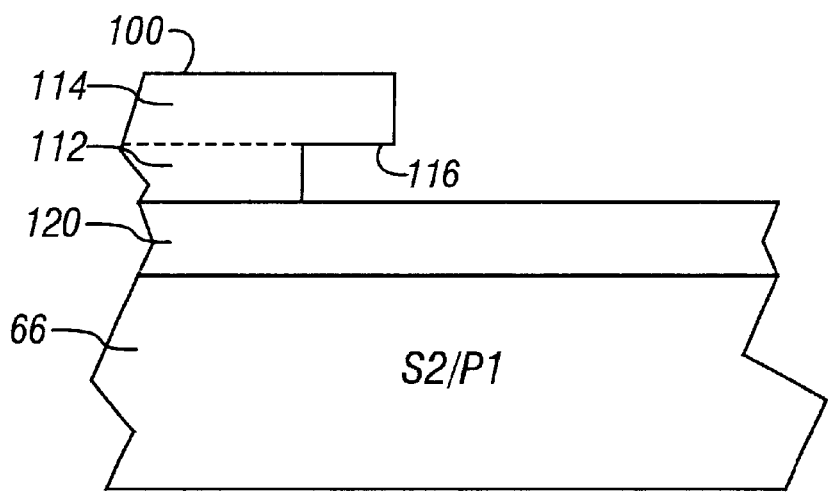
Figure 7:
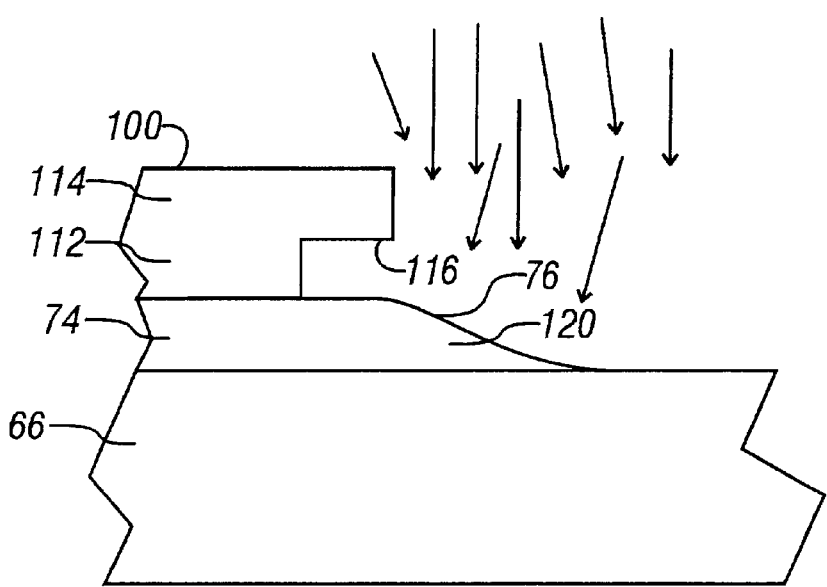

With continued reference to FIG. 4, in a step 96 a layer 120 of high $B_{sat}$ material is deposited This layer is deposited as a thin film, which is preferably deposited onto the first pole 66 and insulation 95 either by sputtering or electroplating, as can be seen in FIG. 5. In one embodiment of the invention, the high $B_{sat}$ material is FeXN, wherein X is one or more of Rh, Ta or Al. This material can be either sputter deposited in a single layer or applied as a plurality of laminated films, and is preferably deposited to a thickness of 0.1–1.0 $\mu$m, or more preferably less than 0.5 $\mu$m. Thereafter, in a step 98, a photolithography process is used to form a bi-layer photoresist 100 which can be more clearly understood with reference to FIG. 6. The bi-layer photoresist is formed to pattern the pedestal 74, and includes a bottom layer 112, and an upper layer 114 which extends beyond the first layer forming an overhang 116. Thereafter, in a step 118, an ion milling process is performed to selectively remove unwanted high $B_{sat}$ material, forming the pedestal 74 as can be seen with reference to FIG. 7. The ion milling process is preferably performed so as to form a desirable sloped or tapered edge 76 on the pedestal 74.

Figure 8:
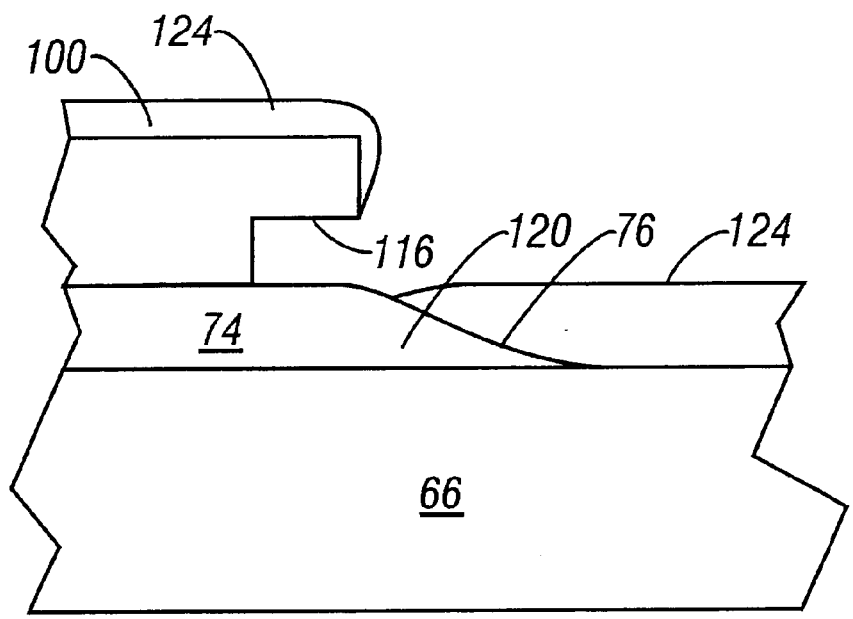
Figure 9:
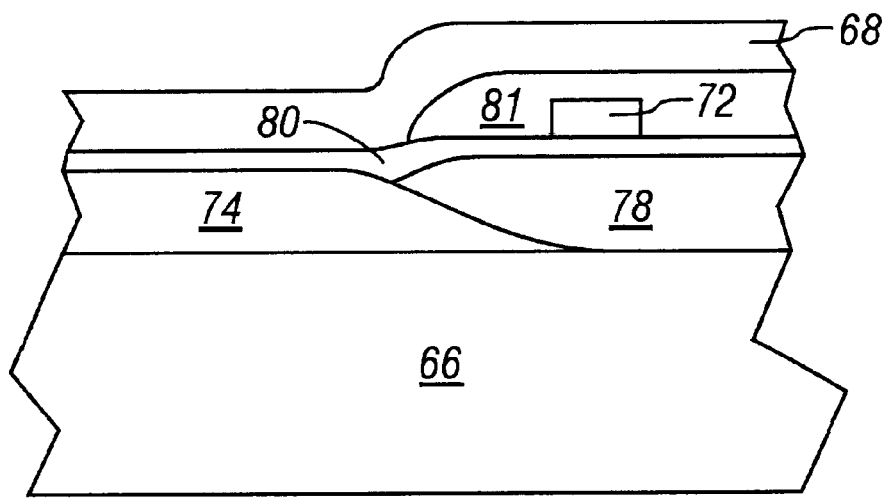

With continued reference to FIG. 4, in a step 122 a layer of $Al_2O_3$ 124 is deposited. With reference to FIG. 8 it will be appreciated that the $Al_2O_3$ insulation layer 124 as deposited covers the first pole 66 and the bi-layer photoresist 100. In addition, the insulation layer 124 partially covers the portion of the pedestal covered by the overhang 116 of the bi layer photoresist 100. The insulation layer terminates in a smoothly tapered edge, and the location at which the insulation terminates can be controlled by controlling the amount of overhang of the bi-layer photoresist 100 and can also be controlled by the deposition process used to deposit the insulation layer. The location of the termination of the insulation layer can be controlled to within +/−0.25 $\mu$m of a predetermined target location relative to the tapered edge of the pedestal. The insulation layer preferably has an edge which terminates near the apex of the tapered edge of the pedestal, that is, at the point where the tapered edge meets the flat top of the pedestal. In addition, the insulation layer 124 preferably is formed to a height that is roughly the same as the height of the pedestal.

With reference still to FIG. 4, in a step 126 the bi-layer photoresist 100 is lifted off. This is accomplished by applying a solvent. However, as will be appreciated by those skilled in the art, solvents used to remove such a photoresist will not dissolve the $AL_2O_3$. The overhang 116 provided by the bi-layer photoresist 100 facilitates lifting off the photoresist 100, by leaving a portion of the photoresist 100 uncovered by $Al_2O_3$. Thus, the overhang 116 allows solvent to enter and contact the photoresist in order to lift it off.

Thereafter, in a step 128, a layer of write gap material 80 is deposited. Then, in a step 130, a coil 72 is formed. The coil is preferably constructed of copper formed by a plating process which will be familiar to those skilled in the art. Subsequently, in a step 132 another insulation layer is deposited, thus forming the second insulation layer 81 discussed with reference to FIG. 3. Then, in a step 134 the second pole 68 is formed. The second pole is constructed of magnetic material, such as for instance FeXN and can be formed by sputtering or plating as necessitated by the choice of material.

While the present invention has been particularly shown and described with reference to the preferred embodiments, it will be understood by those skilled in the art that various changes in form and detail may be made without departing from the spirit, scope, and teaching of the invention. Accordingly, the disclosed invention is to be considered merely as illustrative and limited in scope only as specified in the appended claims.

What is claimed is:

1. A method for forming an inductive write element, comprising the steps of:

a. providing a first pole constructed of a soft magnetic material;

b. depositing a high magnetic moment material upon said pole;

c. depositing a bi-layer photoresist onto a portion of said high magnetic moment material;

d. etching said high moment material to remove a portion of the high moment material not covered by said bi-layer photoresist;
e. depositing a first insulation layer;
f. removing said bi-layer photoresist;
g. depositing a write gap material onto said first insulation layer and at least a pedestal portion of said high moment material;
h. forming an electrical coil upon said write gap material;
i. depositing a second insulation layer upon said write gap material and said electrically conductive coil; and
j. forming a second pole over said second insulation layer and a portion of said write gap material, said second pole being electrically connected with said first pole at a location distal from said pedestal portion.

2. The method of claim 1, wherein said bi-layer photoresist is formed in a two step process resulting in a first photoresist layer and a second photoresist layer formed upon and extending beyond an edge of said first photoresist layer.

3. The method of claim 1 wherein said etching step is performed by ion milling.

4. The method of claim 1 wherein said etching step forms a tapered edge on said high magnetic moment material.

5. The method of claim 1 wherein said etching step forms a thin, high magnetic moment pedestal.

6. The method of claim 1 wherein said high magnetic moment material is a material including Fe and N.

7. The method of claim 1 wherein said high magnetic moment material is deposited by sputtering.

8. The method of claim 1 wherein said first and second insulating layers are $Al_2O_3$.

9. The method of claim 1 further comprising the step of planarizing said first pole using a chemical mechanical polishing process prior to deposit said high magnetic moment material.

* * * * *

UNITED STATES PATENT AND TRADEMARK OFFICE
CERTIFICATE OF CORRECTION

PATENT NO.      : 6,430,806 B1
DATED           : August 13, 2002
INVENTOR(S)     : Chen et al.

It is certified that error appears in the above-identified patent and that said Letters Patent is hereby corrected as shown below:

<u>Column 1,</u>
Line 24, replace "wit", with -- with --;
Line 26, replace "read element As" with -- read element. As --;

<u>Column 2,</u>
Line 27, replace "Width" with -- trackwidth --;
Line 29, replace "contrued" with -- constructed --.

Signed and Sealed this

Eighth Day of April, 2003

JAMES E. ROGAN
*Director of the United States Patent and Trademark Office*